United States Patent
Kwon et al.

(10) Patent No.: US 9,773,476 B2
(45) Date of Patent: Sep. 26, 2017

(54) CACHE MEMORY SYSTEM FOR A PIXEL SHADER AND METHOD OF OPERATING THE SAME

(71) Applicant: Samsung Electronics Co., Ltd., Suwon-si (KR)

(72) Inventors: Kwontaek Kwon, Hwaseong-si (KR); Heejun Shim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 74 days.

(21) Appl. No.: 14/795,032

(22) Filed: Jul. 9, 2015

(65) Prior Publication Data

US 2016/0118024 A1   Apr. 28, 2016

(30) Foreign Application Priority Data

Oct. 22, 2014   (KR) .................. 10-2014-0143600

(51) Int. Cl.
| | |
|---|---|
| *G09G 5/39* | (2006.01) |
| *G06T 1/60* | (2006.01) |
| *G06F 12/08* | (2016.01) |
| *G06F 12/0846* | (2016.01) |

(52) U.S. Cl.
CPC ........... *G09G 5/39* (2013.01); *G06F 12/0848* (2013.01); *G06T 1/60* (2013.01); *G09G 2360/121* (2013.01)

(58) Field of Classification Search
None
See application file for complete search history.

(56) References Cited

U.S. PATENT DOCUMENTS

| | | | |
|---|---|---|---|
| 6,483,516 B1 | 11/2002 | Tischler | |
| 6,493,800 B1 | 12/2002 | Blumrich | |
| 6,684,297 B2 | 1/2004 | Chaudhry et al. | |
| 6,750,872 B1 * | 6/2004 | Hong | G06T 1/60 345/557 |
| 7,050,063 B1 * | 5/2006 | Mantor | G06T 1/60 345/535 |
| 7,268,787 B2 | 9/2007 | Hong et al. | |

(Continued)

FOREIGN PATENT DOCUMENTS

KR   10-0427523 B1   4/2004

OTHER PUBLICATIONS

Extended European Search Report issued on Mar. 7, 2016 in counterpart European Application No. 15178853.6 (7 pages in English).

(Continued)

*Primary Examiner* — Maurice L McDowell, Jr.
*Assistant Examiner* — Donna J Ricks
(74) *Attorney, Agent, or Firm* — Harness, Dickey & Pierce, P.L.C.

(57) ABSTRACT

A cache memory apparatus including a cache memory including a bank, a partition configuration unit configured to divide the cache memory into partitions by allocating the bank to a texture among textures for rendering, and a controller configured to receive a partition ID, of texture data requested by a device that performs the rendering, determine whether the requested texture data is stored in a partition corresponding to the partition ID among the plurality of partitions, and output the requested texture data to the device based on a result of the determination.

29 Claims, 10 Drawing Sheets

(56) References Cited

U.S. PATENT DOCUMENTS

| | | |
|---|---|---|
| 8,527,713 B2 | 9/2013 | Augsburg et al. |
| 2002/0060684 A1* | 5/2002 | Alcorn .................. G06T 15/04 |
| | | 345/552 |
| 2004/0048653 A1* | 3/2004 | Lefebvre .............. G06T 15/005 |
| | | 463/22 |
| 2004/0189652 A1* | 9/2004 | Emberling ............... G06T 1/60 |
| | | 345/557 |
| 2013/0097386 A1 | 4/2013 | Lee et al. |
| 2015/0097851 A1* | 4/2015 | Anderson ................ G06T 1/60 |
| | | 345/552 |

OTHER PUBLICATIONS

Wong, H. et al, "Demystifying GPU Microarchitecture through Microbenchmarking," University of Toronto (21 pages).

* cited by examiner

CACHE MEMORY SYSTEM FOR A PIXEL SHADER AND METHOD OF OPERATING THE SAME

CROSS-REFERENCE TO RELATED APPLICATION(S)

This application claims the benefit under 35 USC 119(a) of Korean Patent Application No. 10-2014-0143600, filed on Oct. 22, 2014, in the Korean Intellectual Property Office, the disclosure of which is incorporated herein by reference for all purposes.

BACKGROUND

1. Field

The description relates to cache memory systems capable of reducing a cache miss probability and methods of operating the cache memory systems.

2. Description of Related Art

A processor, such as a central processing unit (CPU) or a graphic processing unit (GPU), retrieves a command or data from a large-capacity external memory to process the same. The processing speed of most large-capacity external memories is very low compared to that of a processor, and thus, a cache memory system is used to improve an operation speed of a large-capacity external memory.

A cache memory system stores data that a processor has recently accessed, and if the processor requests the same data again, the cache memory system allows the processor to access a cache memory which has a high processing speed instead of accessing an external memory, thereby improving a data transmission speed.

If data requested by the processor is stored in a data memory of the cache memory system (cache hit), the data in the data memory is transmitted to the processor, and if data requested by the processor is not present (cache miss), the data is read from an external memory. Also, the cache memory system removes one of pieces of cache data stored in the data memory and replaces it with the read data, and the read data is transmitted to the processor.

The cache memory system may be implemented, according to a mapping method, by using a set-associative cache memory that uses a set-associative mapping method and a direct mapped cache memory that uses a direct mapping method. A set-associative cache memory includes a plurality of ways, and in the case of a cache miss, cache data corresponding to a predetermined way is replaced with new data read from an external memory according to a replacement policy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an aspect, a cache memory apparatus includes a cache memory including a bank, a partition configuration unit configured to divide the cache memory into partitions by allocating the bank to a texture among textures for rendering; and a controller configured to receive a partition ID, of texture data requested by a device that performs the rendering, determine whether the requested texture data is stored in a partition corresponding to the partition ID among the plurality of partitions, and output the requested texture data to the device based on a result of the determination.

The cache memory may store some pieces of texture data included in a first texture among the textures, in a partition corresponding to the first texture, and may store some pieces of texture data included in a second texture among the textures in a partition corresponding to the second texture.

The controller may receive a set address and a tag address of the requested texture data, and compare tag data included in a set indicated by the set address from among at least one set included in the partition corresponding to the partition ID, with the tag address to determine whether the requested texture data is stored in the partition corresponding to the partition ID.

When it is determined that one of the tag data and the tag address corresponds to each other as a result of the comparing, the controller may further determine that a cache hit has occurred and output texture data corresponding to the corresponding tag data to the device.

When it is determined that the tag data does not correspond to the tag address as a result of the comparing, the controller may further receive the requested texture data from a region indicated by the tag address of a texture memory.

The partition configuration unit may further compare the number of textures and the number of banks, and may allocate the bank to the texture based on a result of the comparing.

When it is determined that the number of textures is less than the number of banks as a result of the comparing, the partition configuration unit may further allocate the bank to the texture, and additionally may allocate a remaining non-allocated bank to another one of the textures, and may determine a bank allocated to the texture as a partition.

The partition configuration unit may further detect a non-mipmapped texture among the textures, and may additionally allocate the remaining non-allocated bank to the detected non-mipmapped texture.

The partition configuration unit may further analyze an access pattern of the textures based on a result of previous rendering by using a same shader program as a shader program used in the rendering, and may additionally allocate the remaining non-allocated bank to the other one of the textures based on a result of the analysis.

The partition configuration unit may further monitor an access pattern of the textures in real time during the rendering, and may additionally dynamically allocate the remaining non-allocated bank to the other one of the textures based on a result of the monitoring.

When in response to determining that the number of textures is greater than the number of banks as a result of the comparing, the partition configuration unit may further allocate a same bank to a first texture and a second texture among the textures, and determine the same bank as a partition.

The partition configuration unit may further detect the first texture and the second texture that do not share texture coordinates among the textures.

The partition configuration unit may further detect the first texture and the second texture that have different texture dimensions among the textures.

According to an aspect, a method of operating a cache memory apparatus includes dividing the cache memory into partitions by allocating a bank included in a cache memory to a texture among textures used in rendering, receiving a partition ID of texture data requested by a device that performs the rendering, determining whether the requested texture data is stored in a partition corresponding to the partition ID, among the partitions, and outputting the requested texture data to the device based on a result of the determination.

The method may further include receiving a set address and a tag address of the requested texture data, wherein in the determining, data included in a set indicated by the set address from among at least one set included in the partition corresponding to the partition ID is compared with the tag address to determine whether the requested texture data is stored in the partition corresponding to the partition ID.

The outputting of the requested data to the device based on a result of the determining may further include, in response to determining that one of the tag data and the tag address correspond to each other as a result of the comparing, determine that a cache hit has occurred and output texture data corresponding to the corresponding tag data to the device.

The outputting of the requested texture data to the device based on a result of the determining may further include, in response to determining that the tag data does not correspond to the tag address as a result of the comparing, determine that a cache miss has occurred and receive the requested texture data from a region indicated by the tag address of a texture memory.

The dividing of the cache memory into partitions may further include comparing a number of the textures and a number of banks, wherein in the dividing, the bank is allocated to the texture based on a result of the comparing.

When it is determined that the number of textures is less than the number of banks as a result of the comparing, the dividing of the cache memory into partitions may include allocating the bank to the texture, additionally allocating a remaining non-allocated bank to another one of the textures, and determining the bank allocated to the texture as a partition.

The additional allocating of the remaining non-allocated bank to the other one of the textures includes detecting a non-mipmapped texture among the textures; and additionally allocating the remaining, non-allocated bank to the detected non-mipmapped texture.

The additional allocating of the remaining non-allocated bank to another one of the textures may include analyzing an access pattern of the textures based on a result of previous rendering by using a same shader program as a shader program used in the rendering, and additionally allocating the remaining non-allocated bank to the other one of the textures based on a result of the analysis.

The additional allocating of the remaining non-allocated bank to another one of the textures may include monitoring an access pattern of the textures in real time during the rendering, and additionally dynamically allocating the remaining non-allocated bank to the other one of the textures based on a result of the monitoring.

When the number of textures is greater than the number of banks as a result of the comparing, the dividing of the cache memory into the partitions may include allocating a same bank to a first texture and a second texture among the textures, and determining the same bank as a partition.

The dividing of the cache memory into the partitions may include detecting the first texture and the second texture that do not share texture coordinates, among the textures.

The dividing of the cache memory into the partitions may include detecting the first texture and the second texture that have different texture dimensions, among the textures.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
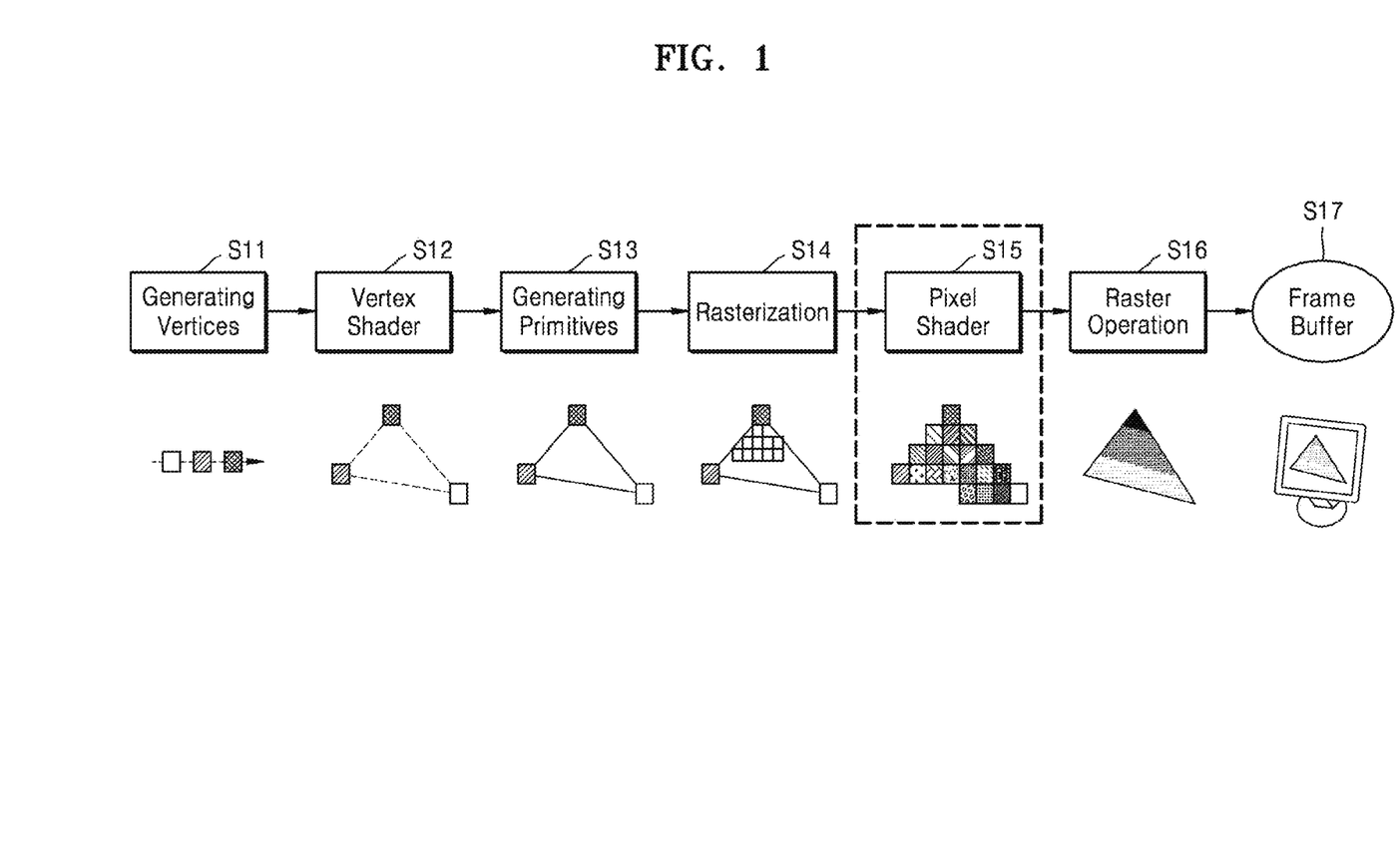
FIG. 1 is a diagram illustrating a rendering operation of a three-dimensional (3D) image.

FIG. 1 illustrates an example of a rendering operation of a three-dimensional (3D) image.

Referring to FIG. 1, in accordance with one configuration, the rendering operation of a 3D image includes operations S11 through S17. Also, figures in the lower part of FIG. 1 conceptually illustrate vertices or processing of pixels in each operation.

In operation S11, vertices indicating an image are generated. The vertices are generated to indicate objects included in an image.

In operation S12, the vertices are shaded. A vertex shader performs shading on the vertices by designating colors of the vertices generated in operation S11.

In operation S13, primitives are generated. A primitive indicates a polygon formed of points, lines, or vertices. For example, primitives may indicate triangles formed by connecting vertices.

In operation S14, a primitive is rasterized. Rasterization of a primitive denotes dividing a primitive into a plurality of fragments. A fragment is a unit that constitutes a primitive and may be a basic unit for performing image processing. A primitive includes information only about vertices. Thus, when generating fragments between vertices in a rasterization operation, interpolation is performed.

Operation S15 denotes pixel shading. While shading is performed in pixel units in FIG. 1, shading is performed also in units of fragments. For example, shading a pixel or a fragment denotes designating a color of the pixel or the fragment.

Operation S16 denotes a raster operation. In a raster operation, color blending, a depth test or the like are performed to generate a raster image (pixels or samples) based on information of a shaded pixel. The generated raster image is output to a frame buffer.

Operation S17 denotes displaying a frame stored in the frame buffer. The frame generated in operations S11 through S16 is stored in the frame buffer. The frame stored in the frame buffer is displayed via a display device.

Figure 2:
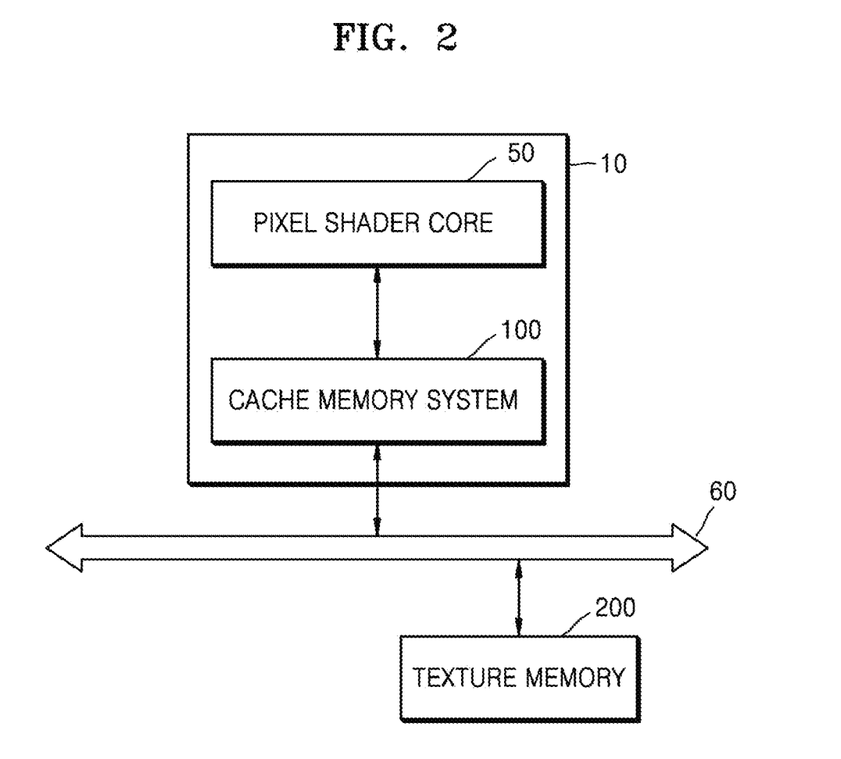
FIG. 2 is a view for explaining an example of a pixel shading processing system.

FIG. 2 is a view for explaining an example of a pixel shading processing system.

In one example, the pixel shading processing system performs pixel shading of operation S15 described with reference to FIG. 1. For convenience of description, the cache memory system is applied to a pixel shading processing system in FIG. 2. However, the examples are not limited thereto, and the cache memory system according to an example may be applied to any system that conducts operations in which texture data is required during rendering.

In addition, although an example where the cache memory system is used in pixel shading is illustrated and described, the exemplary embodiments are not limited thereto, and the cache memory system may be used in any shading process during a rendering operation.

Referring to FIG. 2, the pixel shading processing system includes a graphic processing unit (GPU) 10 and a texture memory 200. The GPU 10 includes a pixel shader core 50 and a cache memory system 100. Although FIG. 2 illustrates the pixel core shader 50 and the cache memory system 100 included in the GPU 10, these components may also be embodied as independent hardware. Therefore, the GPU 10 illustrated in FIG. 2 is not limited thereto and thus may include more or less components. Also, a line of the cache memory system 100 and a line of the texture memory 200 are connected to a system bus 60.

Although the GPU 10 includes the pixel shader core 50 and the cache memory system 100 as illustrated in FIG. 2, the examples are not limited thereto, and the GPU 10 may further include other components to perform each operation described with reference to FIG. 1.

Also, although the cache memory system 100 is separately disposed from the pixel shader core 50 in FIG. 2, the examples are not limited thereto, and the cache memory system 100 may also be included in a single chip with the pixel shader core 50.

In accordance with one configuration, the pixel shader core 50 performs pixel shading for determining a color value of a pixel during 3D rendering. To request texture data used in determining a color value of a pixel, the pixel shader core 50 accesses the cache memory system 100 before accessing the texture memory 200. The pixel shader core 50 requests different types of texture data from the cache memory system 100. For example, a shader program performed by the pixel shader core 50 requires various types of texture data.

When data or a command requested by the pixel shader core 50 (hereinafter, the data or command is referred to as target data) exists in the cache memory system 100, an operation according to a cache hit is performed. When there is a cache hit, cache data (target data) output from the cache memory system 100 is output to the pixel shader core 50.

The pixel shader core 50 accesses the cache memory system 100 before accessing the texture memory 200 because data of the texture memory 200 (texture data), which is frequently used, has a high probability of being stored in the cache memory system 100. Thus, by accessing the cache memory system 100 before accessing the texture memory 200, a data transmission speed is increased.

Meanwhile, if target data does not exist in the cache memory system 100, an operation according to a cache miss is performed. That is, in this case, the cache memory system 100 accesses the texture memory 200, and data output from the texture memory 200 passes the system bus 60 to be applied to the cache memory system 100. Here, the cache memory system 100 removes one of pieces of previously stored texture data and stores data output from the texture memory 200 in its place.

Figure 3:
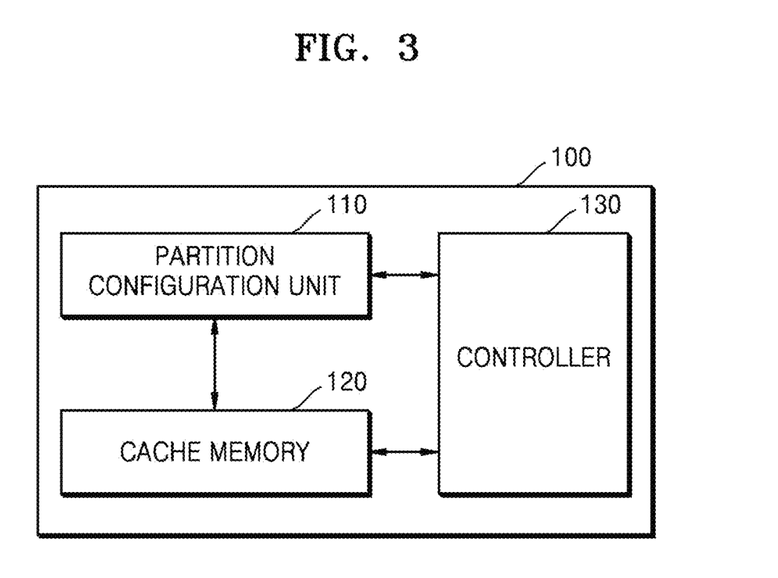
FIG. 3 is a block diagram illustrating an example of a structure of a cache memory system.

FIG. 3 is a block diagram illustrating an example of a structure of a cache memory system 100.

Referring to FIG. 3, the cache memory system 100 includes a partition configuration unit 110, a cache memory 120, and a controller 130. Although FIG. 3 illustrates the partition configuration unit 110, the cache memory 120 and the controller 130 included in the cache memory system 100, the components may be embodied as independent hardware. Accordingly, the cache memory system 100 illustrated in FIG. 3 is not limited thereto and thus the memory system 100 may include more or less components.

In accordance with one configuration, the cache memory 120 includes a tag memory and a data memory. The data memory stores pieces of texture data stored in the texture memory 200 (cache data). That is, the cache data is identical to one of pieces of texture data stored in the texture memory 200. The tag memory stores tag data respectively corresponding to cache data stored in the data memory. Tag data may indicate an actual address of the texture memory 200 in which cache data is stored. Structures of the tag memory and the data memory will be described in detail below with reference to FIG. 4.

Figure 4:
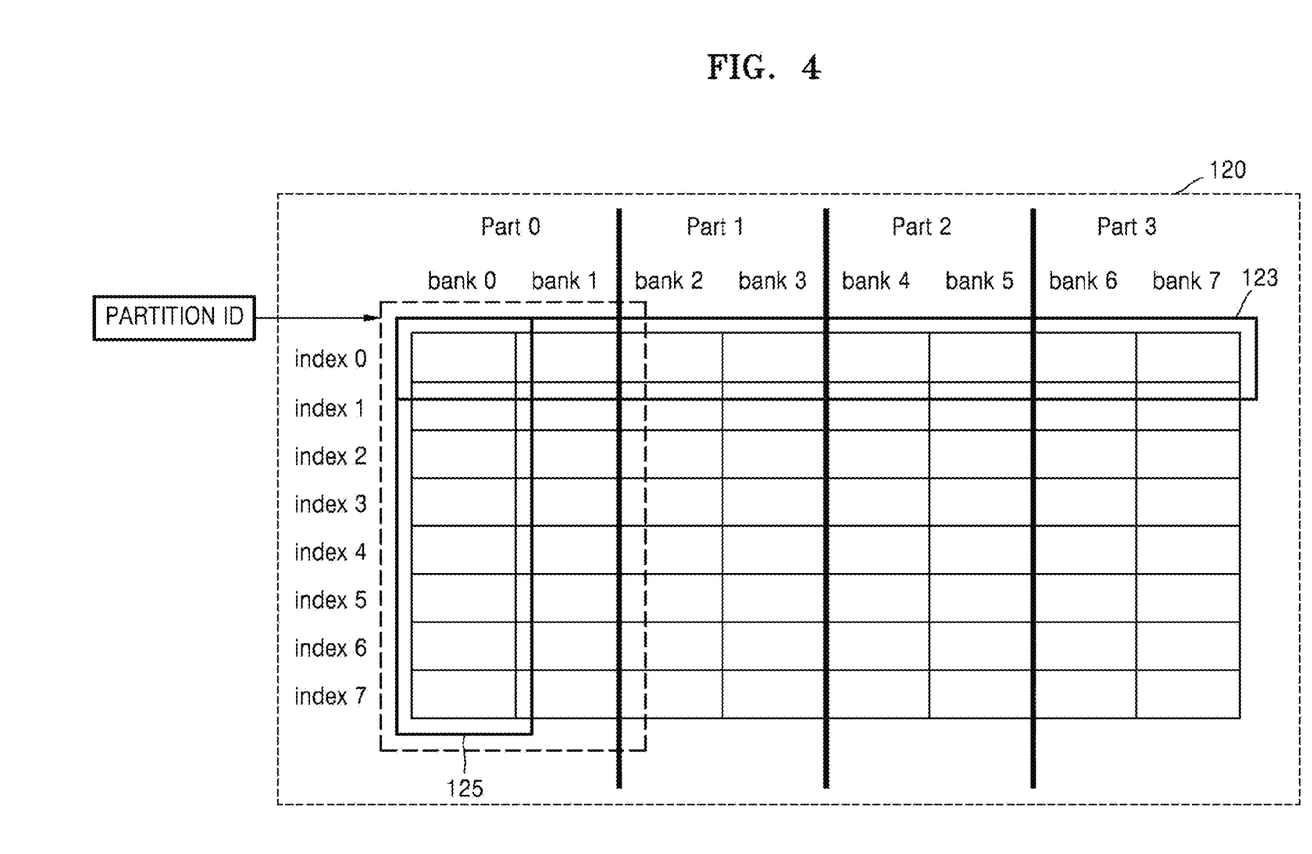
FIG. 4 is a diagram for explaining an example of a cache memory.

FIG. 4 is a diagram for explaining an example of the cache memory 120.

Referring to FIG. 4, the tag memory and the data memory of the cache memory 120 include at least one set 123. The cache memory 120 may include a plurality of ways and at least one bank 125 indicating a way. Also, a row of the cache memory 120 indicates a set, and a column of the cache memory 120 indicates a bank.

FIG. 4 illustrates a structure of an 8-way associative cache memory having eight ways. As illustrated in FIG. 4, when the cache memory 120 is formed of an 8-way set-associative cache memory, the cache memory 120 includes eight banks (bank 0 through bank 7). Also, the cache memory 120 of FIG. 4 includes eight sets, and the eight sets are divided according to indices (index 0 through index 7). The set 123 may include eight pieces of cache data (first through eighth data) and eight pieces of tag data (first through eighth tag data) indicating addresses of the respective eight pieces of cache data. Also, the eight pieces of tag data correspond to the first through eighth ways, respectively.

Further, the cache memory 120 may include a plurality of partitions, and a partition may include at least one bank. Also, the plurality of partitions may be divided according to partition IDs. For example, the cache memory 120 of FIG. 4 includes four partitions, and the partitions are divided according to partition IDs (for example, Part 0, Part 1, Part 2, and Part 3).

The controller 130 may receive a partition ID of texture data requested from the outside to determine whether requested texture data is stored in a corresponding partition.

Referring to FIG. 4, in accordance with one configuration, the controller 130 receives a partition ID of texture data requested from the outside (for example, from a pixel shader core). When a partition ID is received, the controller 130 determines whether requested texture data is stored in a partition corresponding to the partition ID. This will be described in detail with reference to FIG. 5. Also, for convenience of description, the partition corresponding to the received partition ID will be described as a first partition (Part 0).

Figure 5:
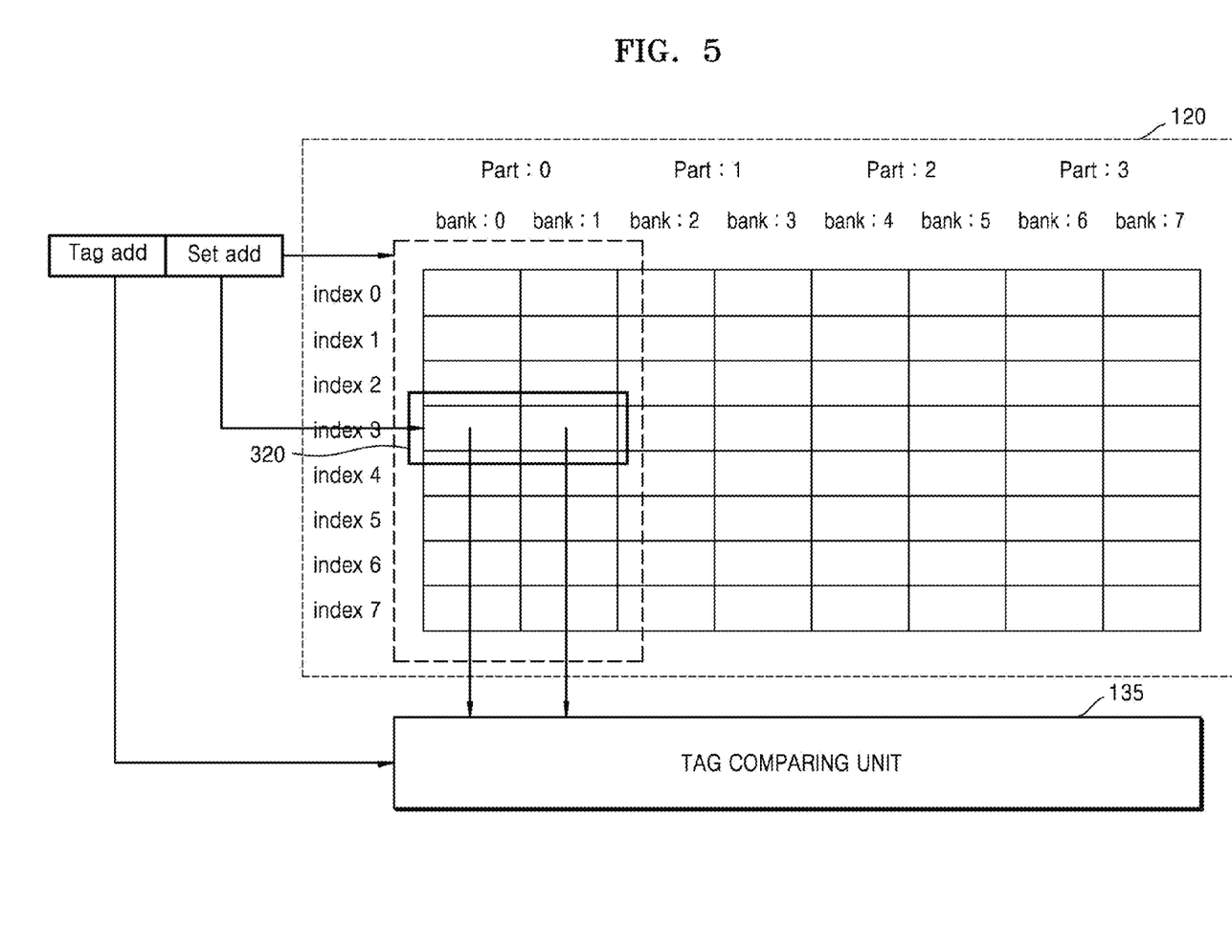
FIG. 5 is a reference diagram for explaining an example of a method of operating a cache memory system.

FIG. 5 is a reference diagram for explaining an example of a method of operating the cache memory system 100. Referring to FIG. 5, in accordance with one configuration, the cache memory system 100 receives an address bit of requested texture data. The address bit includes a tag address "Tag add" and a set address "Set add" as illustrated in FIG. 5. The set address Set add is data indicating a row address of the cache memory 120. That is, the set address Set add indicates one of a plurality of sets included in the cache memory 120.

The controller 130 includes a tag comparing unit 135, and the tag comparing unit 135 compares each piece of tag data included in a set 320 (index 3) indicated by a set address Set add among a plurality of sets in the first partition (Part 0) with each tag address to determine whether any tag data corresponds to any tag address.

When a tag address Tag add corresponds to one of the pieces of tag data, the controller 130 determines this case as a cache hit. That is, a cache hit indicates that requested texture data (target data) is stored in a corresponding partition. When the controller 130 has determined a cache hit, cache data corresponding to the tag data that corresponds to the tag address Tag add may be output to the outside (for example, to a pixel shader core). The controller 130 reads cache data stored in the cache memory 120 and outputs the same to the outside.

On the other hand, if none of the tag data corresponds to a tag address, the controller 130 determines this case as a cache miss. That is, a cache miss indicates that texture data requested from the outside is not stored in a corresponding partition. When the controller 130 has determined a cache miss, the controller 130 outputs a cache miss signal to the texture memory 200 and requests the texture data requested from the outside (target data).

The controller 130 removes one of pieces of cache data included in a set indicated by a set address among a plurality of sets included in the corresponding partition and replaces the removed cache data with texture data received from the texture memory 200.

Figure 6:
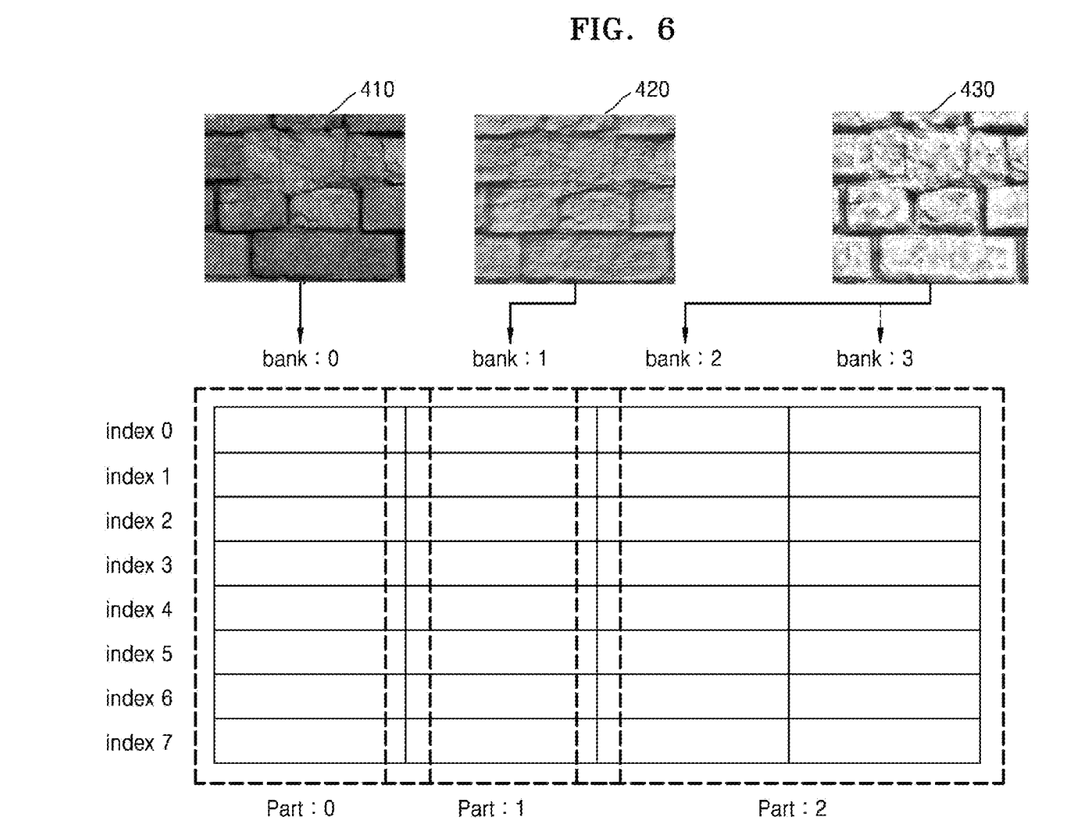
FIGS. 6 and 7 are reference diagrams for explaining an example of a method of dividing a cache memory into a plurality of partitions in a cache memory system.
Figure 7:
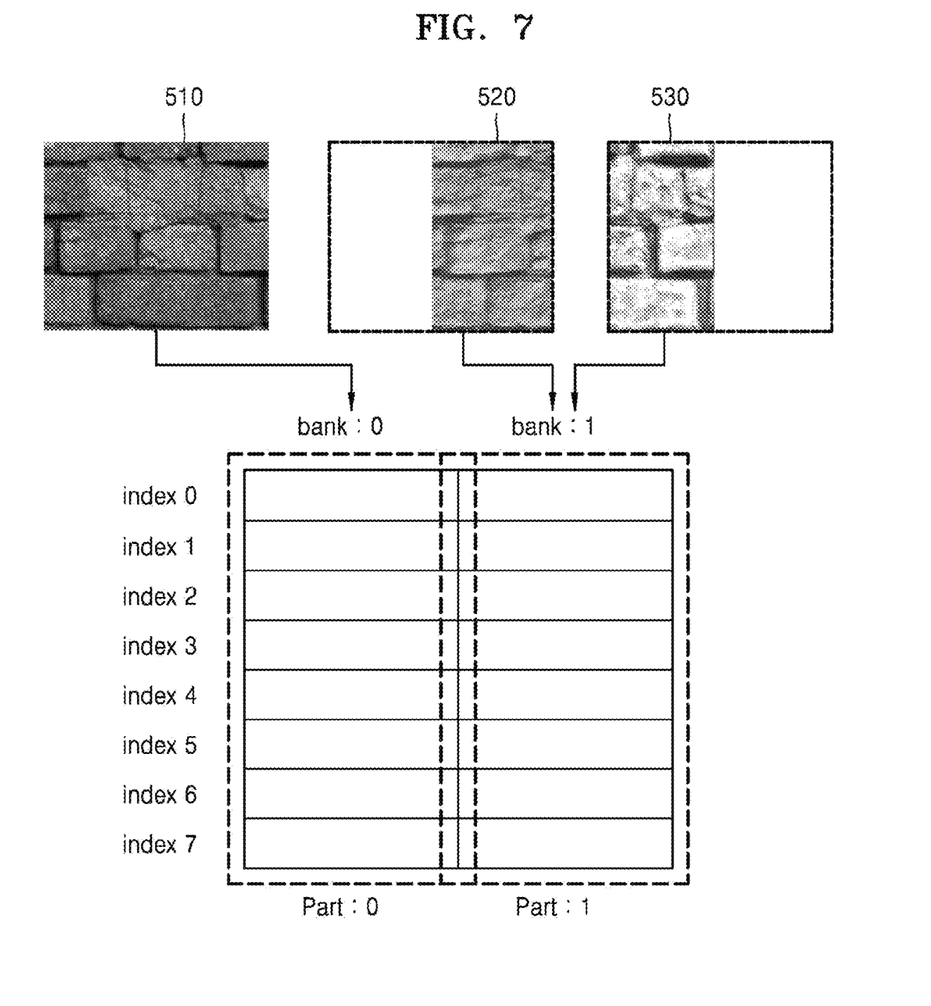

Further, the partition configuration unit 130 determines a plurality of partitions. The partition configuration unit 130 compares the number of textures needed in pixel shading and compares the number of banks included in the cache memory 120, and allocates banks to a plurality of textures based on a comparison result, and determines a partition. This will be described in detail with reference to FIGS. 6 and 7. FIGS. 6 and 7 are reference diagrams for explaining an example of a method of dividing a cache memory into a plurality of partitions in a cache memory system.

FIG. 6 is a diagram for explaining a method of dividing a cache memory into a plurality of partitions when the number of banks is greater than the number of needed textures.

Referring to FIG. 6, when the number of banks is greater than the number of needed textures, the partition configuration unit 110 allocates a bank to each of a plurality of textures. For example, in pixel shading, three textures (a first texture 410, a second texture 420, and a third texture 430) are used, and the first through third textures 410, 420, and 430 are stored in the texture memory 200. Also, the cache memory 120 is formed of a 4-way cache memory and include first through fourth banks (bank 0, bank 1, bank 2, and bank 3). The partition configuration unit 110 allocates the first bank (bank 0) to the first texture 410, the second bank (bank 1) to the second texture 420, and the third bank (bank 2) to the third texture 430.

Also, the partition configuration unit 110 may additionally allocate the remaining, non-allocated bank to one of the plurality of textures. For example, the fourth bank (bank 3) which is not allocated may be additionally allocated to one of the first through third textures 410, 420, and 430, and a remaining bank (the fourth bank) (not illustrated) may be additionally allocated to a texture having a high conflict miss probability among a plurality of textures (the first through third textures 410, 420, and 430). In this case, the fourth bank (bank 3) is allocated to the third structure 430. A conflict miss indicates a miss that occurs when the number of ways is short because many pieces of mapped data are present in one set of a cache memory. Here, when the number of ways is increased, a probability of conflict miss may be reduced.

Further the partition configuration unit 110 detects a non-mipmapped texture among the first through third textures 410, 420, and 430, and additionally allocates the fourth bank (bank 3) to the detected texture. The mipmapped texture may further include, in addition to a texture of an original size, textures that are reduced to ½, ¼, and ⅛ in size. When using a mipmapped texture in pixel shading, a texture having an appropriate size for a size of a pixel to be shaded may be used to increase cache efficiency (cache hit probability). However, a non-mipmapped texture may have more pieces of texture data that are mapped onto a same set and have a higher conflict miss probability than a mipmapped texture. Thus, the partition configuration unit 110 may additionally allocate a bank to a non-mipmapped texture.

Also, the partition configuration unit 110 analyzes an access pattern of textures based on a result of previous pixel shading using the same shader program as that used in present pixel shading. The partition configuration unit 110 allocates a remaining bank to a texture with most conflict misses based on a result of analyzing access patterns. For example, if most conflict misses have occurred when accessing data about the third texture 430 among the first through third textures 410, 420, and 430, the partition configuration unit 110 allocates the fourth bank (bank 3) to the third texture 430.

Also, when performing pixel shading, the partition configuration unit 110 monitors access patterns of textures in real time. The partition configuration unit 110 allocates a remaining bank to a texture with most conflict misses based on a result of monitoring an access pattern. For example, when accessing texture data included in the third texture 430 among the first through third textures 410, 420, and 430, if most conflict misses have occurred, the partition configuration unit 110 allocates a fourth bank (bank 3) to the third texture 430.

When all banks included in the cache memory 120 are allocated to any one of a plurality of textures, the partition configuration unit 110 determines at least one bank allocated to a texture as a partition. For example, the partition configuration unit 110 may determine the first bank (bank 0) allocated to the first texture 410 as a first partition (part 0), the second bank (bank 1) allocated to the second texture 420 as a second partition (part 1), the third bank (bank 2) and the fourth bank (bank 3) allocated to the third texture 430 as a third partition (part 2).

FIG. 7 is a diagram for explaining an example of a method of dividing a cache memory into a plurality of partitions when the number of banks is greater than the number of needed textures.

Referring to FIG. 7, when the number of needed textures is greater than the number of banks, the partition configuration unit 110 allocates a same bank to at least two textures among a plurality of textures.

The partition configuration unit 110 allocates the same bank to textures that do not share texture coordinates among a plurality of textures. Alternatively, the partition configuration unit 110 allocates the same bank to textures having different texture dimensions.

For example, when performing pixel shading, three textures (a first texture 510, a second texture 520, and a third texture 530) are used. Also, a cache memory is formed of a 2-way cache memory and includes a first bank (bank 0) and a second bank (bank 1). In this case, the partition configuration unit 110 allocates the same bank to two or three textures.

Referring to FIG. 7, the first texture 510 and the second texture 520 share a portion of texture coordinates, and the first texture 510 and the third texture 530 also share a portion of texture coordinates. However, the second texture 520 and the third texture 530 do not share texture coordinates. That is, the second texture 520 and the third texture 530 do not include identical coordinates. Thus, the partition configuration unit 110 allocates the first bank (bank 0) to the first texture 510, and the second bank (bank 1) to the second texture 520 and the third texture 530.

The partition configuration unit 110 determines each bank as a partition. For example, the partition configuration unit 110 determines the first bank (bank 0) allocated to the first texture 510 as a first partition (part 0) and the second bank (bank 1) allocated to the second texture 520 and the third texture 530 as a second partition (part 1). That is, the second texture 520 and the third texture 530 correspond to the same partition.

As described above, when a partition corresponding to a texture is determined, texture data is mapped onto the corresponding partition and stored in a cache memory. For example, when a partition corresponding to a first texture is determined as a first partition, and a partition corresponding to a second texture is determined as a second partition, first texture data is mapped onto the first partition to be stored in a cache memory, and second texture data is mapped onto the second partition to be stored in the cache memory.

Figure 8:
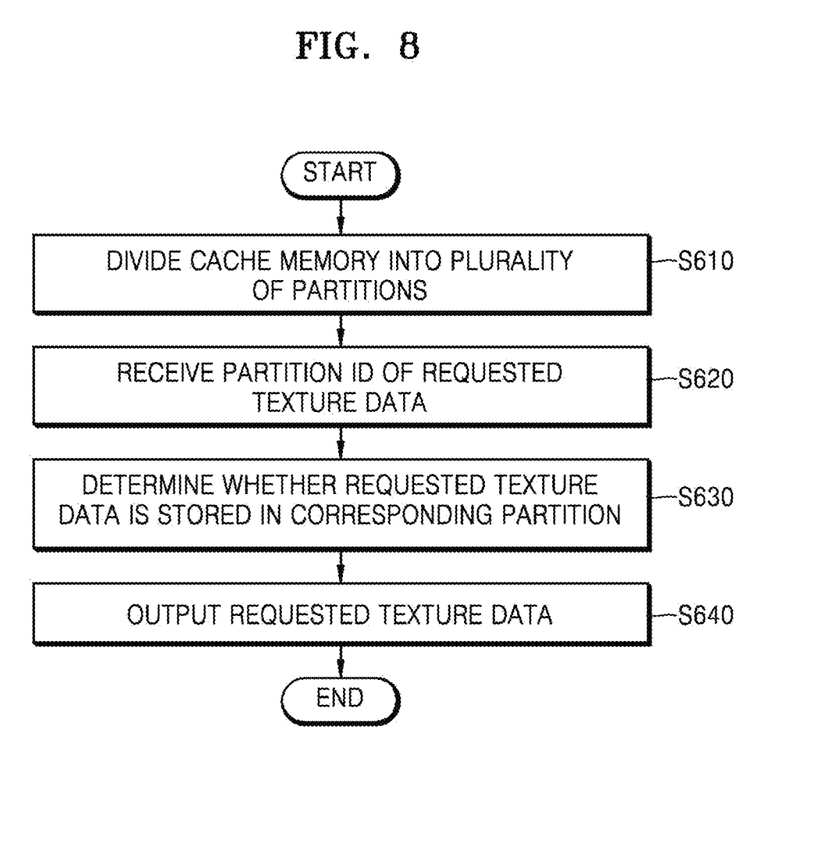
FIG. 8 is a flowchart of an example of a method of operating a cache memory system.

FIG. 8 is a flowchart of an example of a method of operating the cache memory system 100.

Referring to FIG. 8, the cache memory system divides a cache memory into a plurality of partitions in operation S610.

For example, the cache memory system 100 allocates at least one bank included in the cache memory 120 to at least one of a plurality of textures stored in a texture memory to divide the cache memory 120 into a plurality of partitions.

During pixel shading, the cache memory system 100 compares the number of needed textures and the number of banks included in the cache memory 120. For example, in one configuration, a shader program executed by the pixel shader core 50 requires various types of textures, and types of needed textures vary according to shader programs. The cache memory system 100 receives types or coordinates information of textures used in a shader program, from the pixel shader core 50. Accordingly, the cache memory system 100 determines the number of textures needed in pixel shading. Further, the cache memory system 100 compares the number of needed textures with the number of banks included in the cache memory 120.

The cache memory system 100 allocates banks to a plurality of textures based on a comparison result and determines a partition. This will be described in detail with reference to FIGS. 9 and 10.

Referring to FIG. 8 again, the cache memory system 100 receives a partition ID of requested texture data in operation S620.

For example, the received partition ID indicates a texture type of requested texture data, and corresponds to one of a plurality of partitions included in the cache memory system 100. Also, the cache memory system 100 receives address bits of the requested texture data. The address bits may include a tag address and a set address.

The cache memory system determines whether the requested texture data is stored in a corresponding partition in operation S630.

The cache memory system 100 determines whether each piece of tag data included in a set indicated by a set address among a plurality of sets included in the partition corresponding to the received partition ID, corresponds to a tag address. The cache memory system 100 determines that the requested texture data is stored in the corresponding partition (cache hit) when a tag address corresponds to one of the pieces of tag data.

On the other hand, if none of tag data corresponds to a tag address, the cache memory system 100 determines that the requested data is not stored in the corresponding partition.

The cache memory system 100 outputs the requested texture data to the outside based on a determination result in operation S640.

For example, in response to determining that a cache hit has occurred, the cache memory system 100 outputs cache data corresponding to a tag address to the outside (for example, to a pixel shader core). On the other hand, in response to determining that a cache miss has occurred, the cache memory system 100 outputs a cache miss signal to the texture memory 200, and request texture data that is requested from the outside (target data), from the texture memory 200. Accordingly, the cache memory system 100 receives new texture data from the texture memory 200 and outputs the received texture data to the outside. Also, the cache memory system 100 removes one of pieces of cache data included in the set indicated by one of a plurality of sets included in the corresponding partition and replaces the removed cache data with the texture data received from the texture memory 200.

Figure 9:
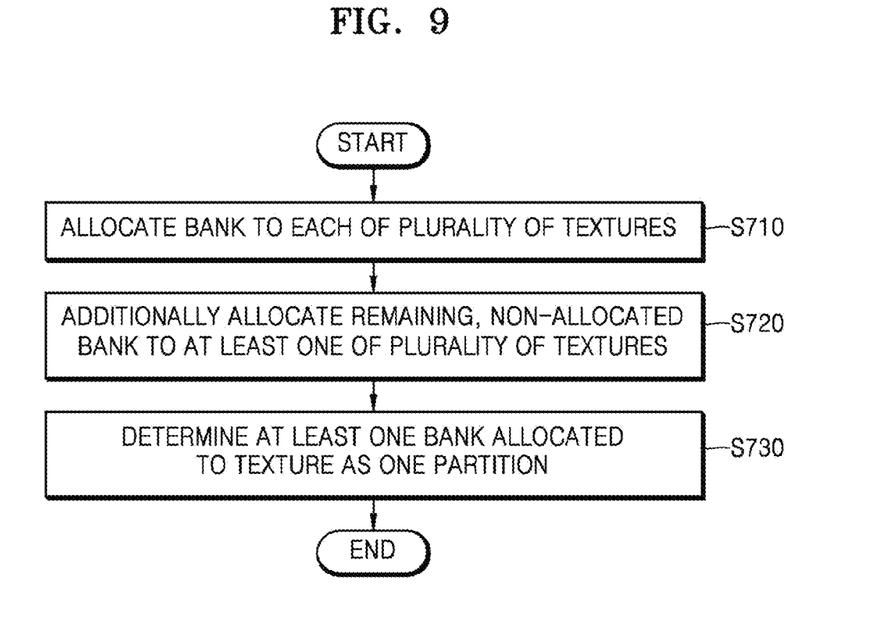
FIGS. 9 and 10 are flowcharts of an example of an operation of dividing a cache memory into a plurality of partitions of FIG. 8.

FIG. 9 is a flowchart of operation S610 of FIG. 8. In detail, FIG. 9 is a flowchart of an example of a method of dividing a cache memory into a plurality of partitions.

Referring to FIG. 9, the cache memory system allocates a bank to each of a plurality of textures.

For example, when performing pixel shading, if three textures (a first texture, a second texture, and a third texture) are used, and the cache memory 120 is formed of a 4-way cache memory and includes first through fourth banks, a first bank is allocated to the first texture, a second bank is allocated to the second texture, and a third bank is allocated to the third texture. That is, the banks are allocated to each of a plurality of textures in operation S710.

The cache memory system 100 additionally allocates a remaining, non-allocated bank to at least one of the plurality of textures in operation S720.

For example, the cache memory system 100 detects a non-mipmapped texture among a plurality of textures, and additionally allocates a remaining, non-allocated bank to the detected texture.

Also, the cache memory system 100 analyzes an access pattern of textures based on a result of performing previous pixel shading by using the same shader program as that used in current pixel shading. The cache memory system 100 allocates a remaining bank to a texture with most conflict misses based on a result of analyzing the access pattern.

Also, the cache memory system 100 monitors an access pattern of texture data in real time when performing pixel shading and allocates a remaining bank to a texture with most conflict misses.

The cache memory system 100 determines at least one bank allocated to a texture as a partition in operation S730.

Figure 10:
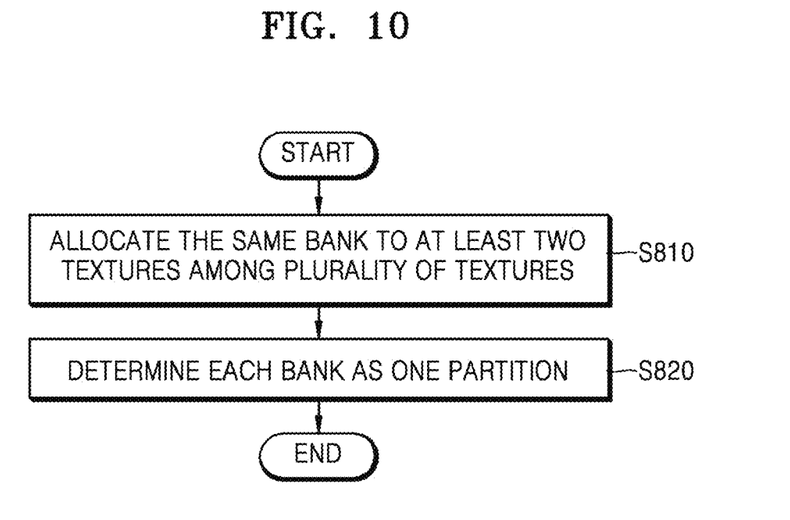

FIG. 10 is a flowchart of operation S610 of FIG. 8 according to another example. In detail, FIG. 10 is a flowchart of an example of a method of dividing a cache memory into a plurality of partitions when the number of required textures is greater than the number of banks included in a cache memory.

Referring to FIG. 10, the cache memory system 100 allocates a same bank to at least two textures among a plurality of textures in operation S810.

The cache memory system 100 allocates the same bank to textures that do not share texture coordinates among a plurality of textures. Alternatively, the cache memory system 100 allocates the same bank to textures having different texture dimensions.

The cache memory system 100 determines each bank as a partition in operation S820.

As described above, according to the one or more of the above examples, a cache miss probability is reduced by efficiently allocating banks to a plurality of textures.

Also, as a caching operation is performed only in a corresponding partition, power consumption is reduced.

The cache memory system and the method of operating the same according to the examples are not limited to the structure and method of the above-described examples. Some or all of the examples may be selectively combined to make a variety of modifications.

The pixel shader core 50, the cache memory system 100, and the texture memory 200 as well as the partition configuration unit 110, the cache memory 120 and the controller 130 illustrated in FIGS. 1 and 2 that perform the operations described herein with respect to FIGS. 8-10 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 8-10. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 8-10 that perform the operations described herein with respect to FIGS. 1 and 2 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A cache memory apparatus comprising:
 a cache memory including a plurality of banks;
 a partition configuration device configured to,
  divide the cache memory into a plurality of partitions by allocating at least one partition of the plurality of partitions to a texture among a plurality of textures for rendering, the partition including at least one bank,
  compare a number of partitions of the cache memory and a number of textures, and
  when the number of partitions is greater than the number of textures, allocate the plurality of partitions to the plurality of textures on a one-to-one basis and allocate remaining partitions of the plurality of partitions to the textures having a high conflict miss probability; and
 a controller configured to,
  receive a partition ID of texture data requested by a device that performs the rendering,
  determine whether the requested texture data is stored in a partition corresponding to the partition ID among the plurality of partitions, and
  output the requested texture data to the device based on a result of the requested texture data determination.

2. The cache memory apparatus of claim 1, wherein the cache memory is further configured to:
 store some pieces of texture data included in a first texture among the textures in a partition corresponding to the first texture; and
 store some pieces of texture data included in a second texture among the textures in a partition corresponding to the second texture.

3. The cache memory apparatus of claim 1, wherein the controller is further configured to:
 receive a set address and a tag address of the requested texture data; and
 compare tag data included in a set indicated by the set address from among at least one set included in the partition corresponding to the partition ID, with the tag address to determine whether the requested texture data is stored in the partition corresponding to the partition ID.

4. The cache memory apparatus of claim 3, wherein in response to determining that one of the tag data and the tag address corresponds to each other as a result of the comparing, the controller is further configured to determine that a cache hit has occurred and to output texture data corresponding to the corresponding tag data to the device.

5. The cache memory apparatus of claim 3, wherein in response to determining that the tag data does not correspond to the tag address as a result of the comparing, the controller is further configured to receive the requested texture data from a region indicated by the tag address of a texture memory.

6. The cache memory apparatus of claim 1, wherein the partition configuration device is further configured to compare the number of textures and a number of banks, and to allocate the plurality of banks to the plurality of textures based on a result of the comparing.

7. The cache memory apparatus of claim 6, wherein in response to determining that the number of textures is less than the number of banks as a result of the comparing, the partition configuration device is further configured to:
 allocate the bank to the texture;
 additionally allocate a remaining non-allocated bank to another one of the textures; and
 determine a bank allocated to the texture as a partition.

8. The cache memory apparatus of claim 7, wherein the partition configuration device is further configured to:
 detect a non-mipmapped texture among the textures; and
 additionally allocate the remaining non-allocated bank to the detected non-mipmapped texture.

9. The cache memory apparatus of claim 7, wherein the partition configuration device is further configured to:
 analyze an access pattern of the textures based on a result of previous rendering by using a same shader program as a shader program used in the rendering; and
 additionally allocate the remaining non-allocated bank to the other one of the textures based on a result of the analysis.

10. The cache memory apparatus of claim 7, wherein the partition configuration device is further configured to:
 monitor an access pattern of the textures in real time during the rendering, and
 additionally dynamically allocate the remaining non-allocated bank to the other one of the textures based on a result of the monitoring.

11. The cache memory apparatus of claim 6, wherein in response to determining that the number of textures is greater than the number of banks as a result of the comparing, the partition configuration device is further configured to:
 allocate a same bank to a first texture and a second texture among the textures; and
 determine the same bank as a partition.

12. The cache memory apparatus of claim 11, wherein the partition configuration device is further configured to detect the first texture and the second texture that do not share texture coordinates among the textures.

13. The cache memory apparatus of claim 11, wherein the partition configuration device is further configured to detect the first texture and the second texture that have different texture dimensions among the textures.

14. The cache memory apparatus of claim 1, wherein the rendering includes pixel shading.

15. A method of operating a cache memory apparatus, the cache memory apparatus including a cache memory including a plurality of banks, the method comprising:
dividing the cache memory into a plurality of partitions by allocating at least one partition of the plurality of partitions to a texture among a plurality of textures used in rendering, the partition comprising at least one bank;
comparing a number of partitions of the cache memory and a number of textures;
when the number of partitions is greater than the number of textures, allocating the plurality of partitions to the plurality of textures on a one-to-one basis and allocating remaining partitions of the plurality of partitions to the textures having a high conflict miss probability;
receiving a partition ID of texture data requested by a device that performs the rendering;
determining whether the requested texture data is stored in a partition corresponding to the partition ID, among the partitions; and
outputting the requested texture data to the device based on a result of the determination.

16. The method of claim 15, further comprising:
receiving a set address and a tag address of the requested texture data,
wherein in the determining of whether the requested texture data is stored in the partition corresponding to the partition ID, data included in a set indicated by the set address from among at least one set included in the partition corresponding to the partition ID is compared with the tag address to determine whether the requested texture data is stored in the partition corresponding to the partition ID.

17. The method of claim 16, wherein the outputting of the requested data to the device based on a result of the determining comprises, in response to determining that one of a plurality of tag data and the tag address correspond to each other as a result of the comparing, determining that a cache hit has occurred and outputting texture data corresponding to the corresponding tag data to the device.

18. The method of claim 16, wherein the outputting of the requested texture data to the device based on a result of the determining further comprises, in response to determining that tag data does not correspond to the tag address as a result of the comparing, determining that a cache miss has occurred and receiving the requested texture data from a region indicated by the tag address of a texture memory.

19. The method of claim 15, wherein the dividing of the cache memory into partitions further comprises comparing the number of the textures and a number of banks,
wherein in the dividing, the plurality of banks are allocated to the textures based on a result of the comparing.

20. The method of claim 19, wherein in response to determining that the number of textures is less than the number of banks as a result of the comparing, the dividing of the cache memory into partitions comprises:
allocating the bank to the texture;
additionally allocating a remaining non-allocated bank to another one of the textures; and
determining the bank allocated to the texture as a partition.

21. The method of claim 20, wherein the additional allocating of the remaining non-allocated bank to the other one of the textures comprises:
detecting a non-mipmapped texture among the textures; and
additionally allocating the remaining, non-allocated bank to the detected non-mipmapped texture.

22. The method of claim 20, wherein the additional allocating of the remaining non-allocated bank to another one of the textures comprises:
analyzing an access pattern of the textures based on a result of previous rendering by using a same shader program as a shader program used in the rendering; and
additionally allocating the remaining non-allocated bank to the other one of the textures based on a result of the analysis.

23. The method of claim 20, wherein the additional allocating of the remaining non-allocated bank to another one of the textures comprises:
monitoring an access pattern of the textures in real time during the rendering; and
additionally dynamically allocating the remaining non-allocated bank to the other one of the textures based on a result of the monitoring.

24. The method of claim 19, wherein when the number of textures is greater than the number of banks as a result of the comparing, the dividing of the cache memory into the partitions comprises:
allocating a same bank to a first texture and a second texture among the textures; and
determining the same bank as a partition.

25. The method of claim 24, wherein the dividing of the cache memory into the partitions comprises detecting the first texture and the second texture that do not share texture coordinates, among the textures.

26. The method of claim 24, wherein the dividing of the cache memory into the partitions comprises detecting the first texture and the second texture that have different texture dimensions, among the textures.

27. The method of claim 15, wherein the rendering includes pixel shading.

28. A non-transitory computer readable recording medium having embodied thereon computer readable instructions for executing the method of claim 15.

29. A memory apparatus comprising:
a cache memory including a plurality of banks;
a partition configuration device configured to divide the cache memory into a plurality of partitions; and
a controller configured to,
compare a number of banks and a number of textures, and
when the number of banks is greater than the number of textures,
allocate the plurality of banks to a plurality of textures on a one-to-one basis,
allocate remaining banks to the textures having a high conflict miss probability, and
when the number of textures is greater than the number of banks to allocate the plurality banks to the textures that do not share texture coordinates.

* * * * *